(12) United States Patent
Zhang et al.

(10) Patent No.: US 12,184,029 B2
(45) Date of Patent: Dec. 31, 2024

(54) INTEGRAL OPTICAL RESONATOR FOR FREQUENCY CONVERSION

(71) Applicant: Shanxi University, Taiyuan (CN)

(72) Inventors: Kuanshou Zhang, Taiyuan (CN); Jingke Sun, Taiyuan (CN); Jinxia Feng, Taiyuan (CN); Yuanji Li, Taiyuan (CN); Zhenyu Jiang, Taiyuan (CN)

(73) Assignee: Shanxi University, Taiyuan (CN)

( * ) Notice: Subject to any disclaimer, the term of this patent is extended or adjusted under 35 U.S.C. 154(b) by 689 days.

(21) Appl. No.: 17/483,231

(22) Filed: Sep. 23, 2021

(65) Prior Publication Data

US 2022/0100049 A1 Mar. 31, 2022

(30) Foreign Application Priority Data

Sep. 25, 2020 (CN) .......................... 202011023292.2

(51) Int. Cl.
*H01S 3/09* (2006.01)
*H01S 3/00* (2006.01)
*H01S 3/102* (2006.01)
*H01S 3/105* (2006.01)
*H01S 3/109* (2006.01)
*H01S 3/131* (2006.01)
(Continued)

(52) U.S. Cl.
CPC .......... *H01S 3/0092* (2013.01); *H01S 3/1028* (2013.01); *H01S 3/105* (2013.01); *H01S 3/109* (2013.01); *H01S 3/1317* (2013.01); *H01S 3/139* (2013.01); *G02F 1/3501* (2013.01); *G02F 1/353* (2013.01)

(58) Field of Classification Search
CPC ...... H01S 3/0092; H01S 3/1028; H01S 3/105; H01S 3/109; H01S 3/1317; H01S 3/139
See application file for complete search history.

(56) References Cited

U.S. PATENT DOCUMENTS 4,809,291 A * 2/1989 Byer ...................... H01S 3/109
372/4
5,757,827 A * 5/1998 Makio ..................... H01S 3/109
372/98

(Continued)

*Primary Examiner* — Kinam Park
(74) *Attorney, Agent, or Firm* — Wood Herron & Evans LLP

(57) ABSTRACT

An integral optical resonant cavity for frequency conversion is provided. The integral optical resonant cavity includes: a housing, a cavity-length adjustment device, a temperature control device and a nonlinear crystal provided in the temperature control device; a first plano-concave mirror and a second plano-concave mirror included in the cavity-length adjustment device and a nonlinear crystal form the optical resonant cavity; and light passes through the first plano-concave mirror, the nonlinear crystal and the second plano-concave mirror sequentially. The stability of the length of the optical resonant cavity is improved through an integral design thereof, and the stability of the temperature of the nonlinear crystal in the integral optical resonant cavity is improved through the temperature control device, thereby stably controlling relative phases between light fields for the frequency conversion in the resonant cavity. Meanwhile, the length of the integral optical resonant cavity is accurately controlled through the cavity-length adjustment device.

8 Claims, 8 Drawing Sheets

(51) Int. Cl.
*H01S 3/139* (2006.01)
*G02F 1/35* (2006.01)

(56) References Cited

U.S. PATENT DOCUMENTS

| | | | | |
|---|---|---|---|---|
| 5,832,010 A | * | 11/1998 | Fulbert | H01S 3/113 |
| | | | | 372/12 |
| 7,460,570 B2 | * | 12/2008 | Kasai | G02F 1/37 |
| | | | | 359/328 |
| 2009/0028195 A1 | * | 1/2009 | Grapov | G02F 1/3544 |
| | | | | 372/22 |
| 2010/0054284 A1 | * | 3/2010 | Dekker | H01S 3/1086 |
| | | | | 372/3 |
| 2017/0102604 A1 | * | 4/2017 | Ebrahim-Zadeh | G02F 1/39 |
| 2019/0089119 A1 | * | 3/2019 | Lu | H01S 3/08031 |

\* cited by examiner

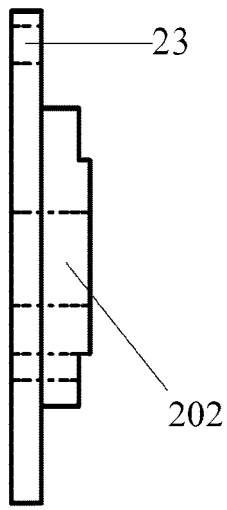
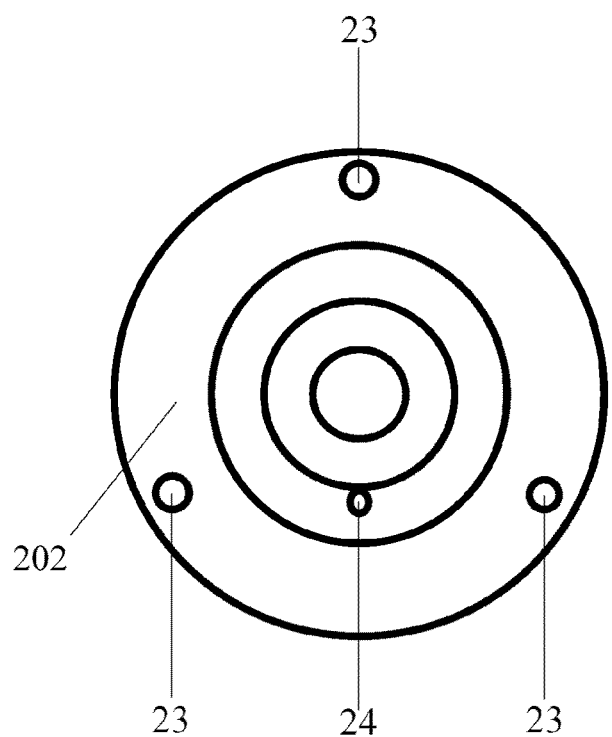
FIG. 4A
FIG. 4B
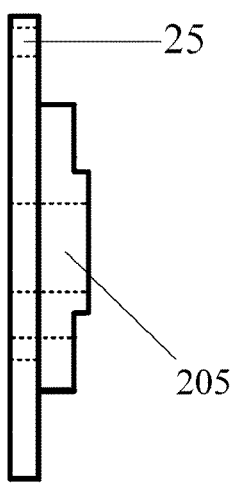
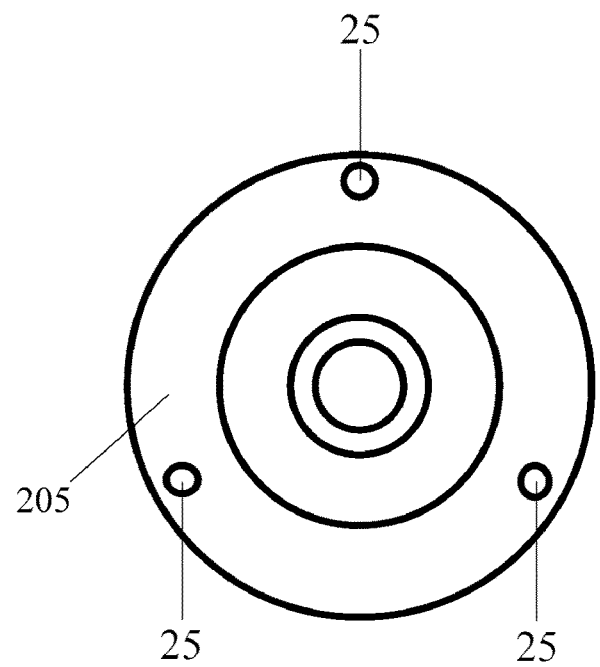
FIG. 5A
FIG. 5B

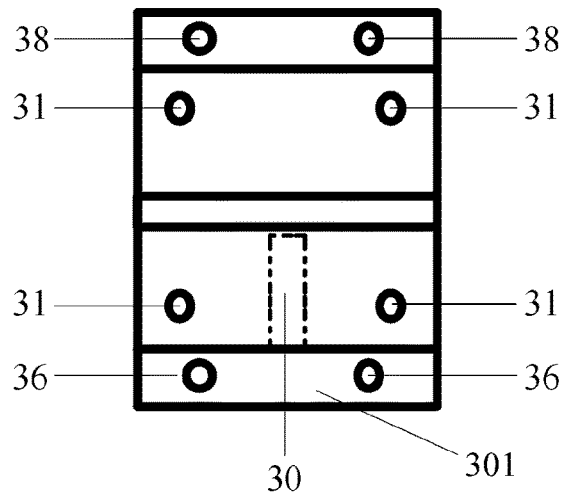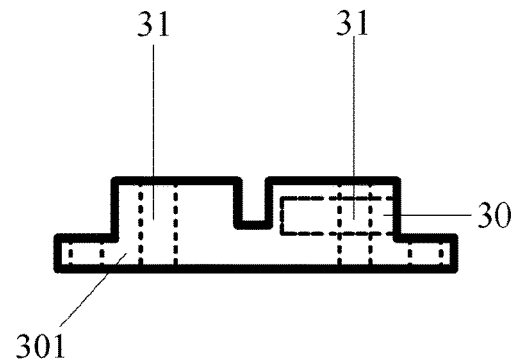
FIG. 6A    FIG. 6B
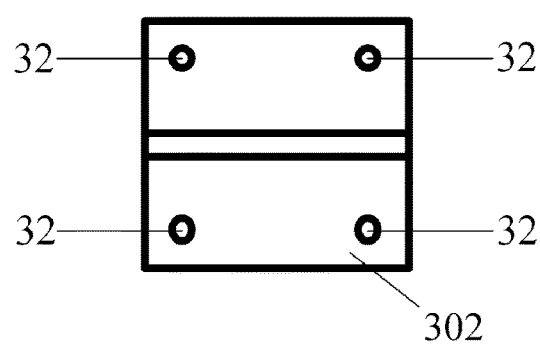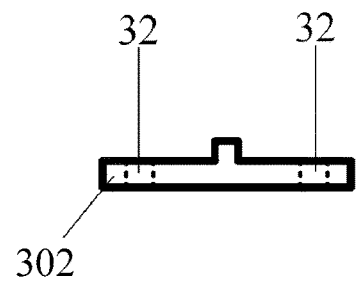
FIG. 7A    FIG. 7B

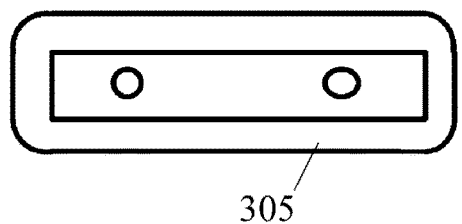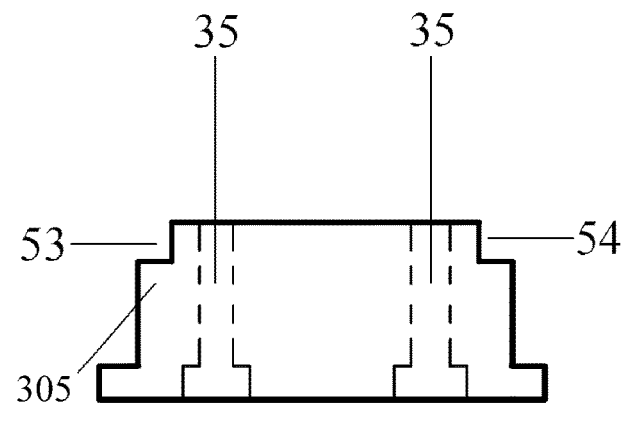
FIG. 10A　　　　　　　　FIG. 10B
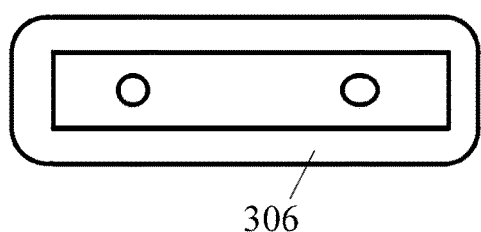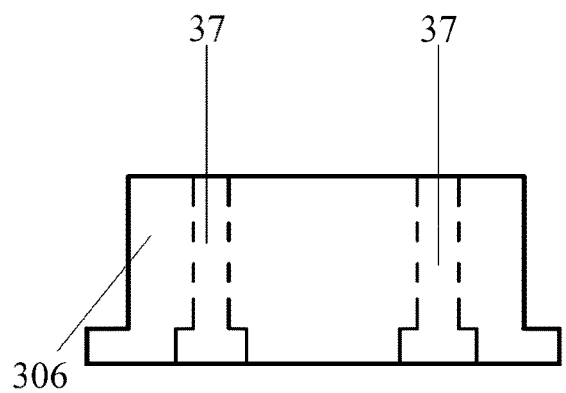
FIG. 11A　　　　　　　　FIG. 11B

INTEGRAL OPTICAL RESONATOR FOR FREQUENCY CONVERSION

CROSS REFERENCE TO RELATED APPLICATION

This patent application claims the benefit and priority of Chinese Patent Application No. 202011023292.2, filed on Sep. 25, 2020, the disclosure of which is incorporated by reference herein in its entirety.

TECHNICAL FIELD

The present disclosure relates to the field of optical resonant cavities, and in particular, to an integral optical resonant cavity for frequency conversion.

BACKGROUND

The optical frequency conversion process is important and indispensable in the fields of classical optics, quantum optics and the like. The high nonlinear efficiency in the optical frequency conversion process is considered as one of the desirable important indicators. The high-power short-wave lasers, mid-infrared lasers and far-infrared wave lasers can be obtained by using the high-efficient optical frequency conversion, so as to provide essential and high-quality laser light sources for breakthroughs in key technologies such as photolithography and laser radar. Furthermore, stably output high-quality quantum entangled light fields and squeezed light fields can be obtained by using the high-efficient optical frequency conversion. Those quantum sources are essential and high-quality quantum light sources for the scientific researches on quantum precision measurement, quantum information processing, quantum computer and so on.

At present, the common device for implementing the high-efficient optical frequency conversion is often constructed with discrete elements. For example, in the Chinese invention patent with application No. 201711487633X entitled "Long-Wave Infrared Optical Parametric Oscillator with High Conversion Efficiency" and the literature "Low Noise Continuous-Wave Single Frequency 780 nm Laser High-Efficiently Generated by Extra-Cavity-Enhanced Frequency Doubling, Chinese Journal of Lasers, 41(5): 0502003 (2014)", the resonant cavity for optical frequency conversion is constructed by two or more optical cavity mirrors and a nonlinear crystal which are discretely disposed. A standing-wave cavity with two optical cavity couplers includes an input concave mirror and an output concave mirror, the centers of both concave mirrors are on a same straight line, and the nonlinear crystal is provided on the same straight line in the cavity, so as to form the resonant cavity for the optical frequency conversion. A ring cavity is a ring structure including an input concave mirror, an output concave mirror and several planar reflected mirrors. Furthermore, these mirrors are arranged in Z-shaped form or in "figure-eight" shaped form, and the nonlinear crystal is provided in the ring cavity to form the resonant cavity for optical frequency conversion.

In the above scheme, as the optical-cavity couplers and the nonlinear crystal are arranged discretely, the whole device is sensitive to external disturbances, thereby affecting the nonlinear conversion efficiency of the optical frequency conversion. For example, the external mechanical vibration, the air flow and the temperature variation may change relative phases between two light fields in the optical resonant cavity, so that the optimal phase matching condition cannot be achieved. Moreover, these factors also change the length of the optical resonant cavity and thus change the matching of the modes. The device with the discrete optical elements also cannot effectively keep the optical elements clean. The loss of the optical resonant cavity increases because both the optical-cavity couplers and the nonlinear crystal could be polluted by external dusts and the like. Due to the above influence factors, the nonlinear conversion efficiency of the optical frequency conversion using the device with discrete optical elements may be greatly reduced.

SUMMARY

In view of this, an objective of the present disclosure is to provide an integral optical resonant cavity for frequency conversion, so as to achieve the optimal conditions of the phase matching, the impedance matching and the mode matching for the optical frequency conversion process, and to obtain the high nonlinear conversion efficiency. Furthermore, the integral design of the whole optical resonant cavity can keep optical-cavity mirrors and the nonlinear crystal clean, which can make the fineness of the optical resonant cavity remain unchanged.

To achieve the above objectives, the present disclosure provides the following solutions.

An integral optical resonant cavity for frequency conversion includes: a housing, a cavity-length adjustment device, a temperature control device and a nonlinear crystal provided in the temperature control device, wherein the cavity-length adjustment device is provided at two ends of the housing; and the temperature control device is provided in the housing; the cavity-length adjustment device comprising a first plano-concave mirror and a second plano-concave mirror; wherein the integral optical resonant cavity includes the first plano-concave mirror, the second plano-concave mirror and the nonlinear crystal; and light passes through the first plano-concave mirror, the nonlinear crystal and the second plano-concave mirror sequentially.

Further, the housing includes a U-shaped base and a U-shaped cover, a groove is formed in the U-shaped base; the U-shaped cover is provided above the U-shaped base in manner of sealing two sides of the groove and a top opening of the U-shaped base; and the temperature control device is provided in the groove of the U-shaped base.

Further, the cavity-length adjustment device includes an adjustable mirror sleeve, a first mirror mount, a piezoelectric ceramic, the first plano-concave mirror, a second mirror mount and the second plano-concave mirror; the adjustable mirror sleeve is provided at a left light-passing hole of the U-shaped base; the first mirror mount is provided in a light-passing hole of the adjustable mirror sleeve; and a convex screw thread on a left end surface of the U-shaped base and a concave screw thread on a right inner surface of the adjustable mirror sleeve are engaged with each other, such that a length of the integral optical resonant cavity is adjusted by rotating the convex screw thread and the concave screw; the second mirror mount is provided in a right light-passing hole of the U-shaped base; the first plano-concave mirror and the piezoelectric ceramic are arranged in the first mirror mount, and the second plano-concave mirror is provided in the second mirror mount; and the first plano-concave mirror, the piezoelectric ceramic, the nonlinear crystal and the second plano-concave mirror are connected sequentially and are colinear.

Further, the first plano-concave mirror is provided with a first curved surface protruded toward the first mirror mount, the second plano-concave mirror is provided with a second curved surface protruded toward the second mirror mount, and the nonlinear crystal is provided between the first curved surface and the second curved surface. Further, the temperature control device includes a crystal oven base, a top cover of the crystal oven base and a thermistor; a groove for loading the nonlinear crystal is formed in the crystal oven base; the top cover of the crystal oven base is provided with a protrusion; the protrusion extends downward to enter the groove of the crystal oven base; and the crystal oven base is provided with a pinhole extended toward a center of the groove from an end surface of the crystal oven base, and the pinhole is used for placing the thermistor.

Further, the temperature control device further includes a thermal insulation sleeve, a thermal insulation sleeve base, a front thermal insulation pad, a rear thermal insulation pad and a Peltier element; the thermal insulation sleeve is provided on an upper portion of the top cover of the crystal oven base, and the thermal insulation sleeve base is provided on a lower portion of the crystal oven base and fixed in a groove of the U-shaped base; the front thermal insulation pad and the rear thermal insulation pad are embedded into the thermal insulation sleeve base to support the crystal oven base and the thermal insulation sleeve base; and the Peltier element is provided between the crystal oven base and the thermal insulation sleeve base.

Further, the nonlinear crystal is one of a periodically poled lithium niobate crystal, a periodically poled $KTiOPO_4$ crystal, a periodically poled MgO-doped lithium niobate crystal, and a periodically poled MgO-doped stoichiometric lithium tantalite crystal.

Further, the housing is made of duralumin.

Further, the crystal oven base, the top cover of the crystal oven base and the thermal insulation sleeve base are made of red copper; and the thermal insulation sleeve, the front thermal insulation pad and the rear thermal insulation pad are made of a polysulfone material.

Based on specific embodiments provided in the present disclosure, the present disclosure discloses the following technical effects.

In the integral optical resonant cavity for frequency conversion provided by the present disclosure, the stability of the length of the optical resonant cavity may be improved through an integral design thereof, and the stability of the temperature of the nonlinear crystal in the integral optical resonant cavity may be also improved through the temperature control device, thereby stably controlling relative phases between the light fields for the frequency conversion in the resonant cavity. Meanwhile, the length of the integral optical resonant cavity is accurately controlled through the cavity-length adjustment device. So, the optimal conditions of the phase matching, the impedance matching and the mode matching for the optical frequency conversion are realized, and the high nonlinear conversion efficiency is obtained. Through the integral design of the whole optical resonant cavity, the optical mirrors and the nonlinear crystal inside the optical resonant cavity are guaranteed to be clean, and the fineness of the optical resonant cavity is kept unchanged. Furthermore, in the present disclosure, the structure is simple, the stability is high, and the size is small. There also exists an advantage that the operation is simple and the batch production is suitable.

BRIEF DESCRIPTION OF THE DRAWINGS

To describe the technical solutions in the embodiments of the present disclosure or in the prior art more clearly, the accompanying drawings required for the embodiments are briefly described below. Apparently, the accompanying drawings in the following descriptions show merely some embodiments of the present disclosure, and a person of ordinary skill in the art may still derive other accompanying drawings from these accompanying drawings without creative efforts.

FIG. 4A illustrates a front schematic view of a first mirror mount in the cavity-length adjustment device according to an embodiment of the present disclosure.

FIG. 4B illustrates a side schematic view of a first mirror mount in the cavity-length adjustment device according to an embodiment of the present disclosure.

FIG. 5A illustrates a front schematic view of a second mirror mount in the cavity-length adjustment device according to an embodiment of the present disclosure.

FIG. 5B illustrates a side schematic view of a second mirror mount in the cavity-length adjustment device according to an embodiment of the present disclosure.

FIG. 6A illustrates a top schematic view of a crystal oven base in a temperature control device according to an embodiment of the present disclosure.

FIG. 6B illustrates a side schematic view of a crystal oven base in a temperature control device according to an embodiment of the present disclosure.

FIG. 7A illustrates a top schematic view of a top cover of the crystal oven base in the temperature control device according to an embodiment of the present disclosure.

FIG. 7B illustrates a side schematic view of a top cover of the crystal oven base in the temperature control device according to an embodiment of the present disclosure.

FIG. 10A illustrates a top schematic view of a front thermal insulation pad in the temperature control device according to an embodiment of the present disclosure.

FIG. 10B illustrates a side schematic view of a front thermal insulation pad in the temperature control device according to an embodiment of the present disclosure.

FIG. 11A illustrates a top schematic view of a rear thermal insulation pad in the temperature control device according to an embodiment of the present disclosure.

FIG. 11B illustrates a side schematic view of a rear thermal insulation pad in the temperature control device according to an embodiment of the present disclosure.

DETAILED DESCRIPTION

Figure 1:
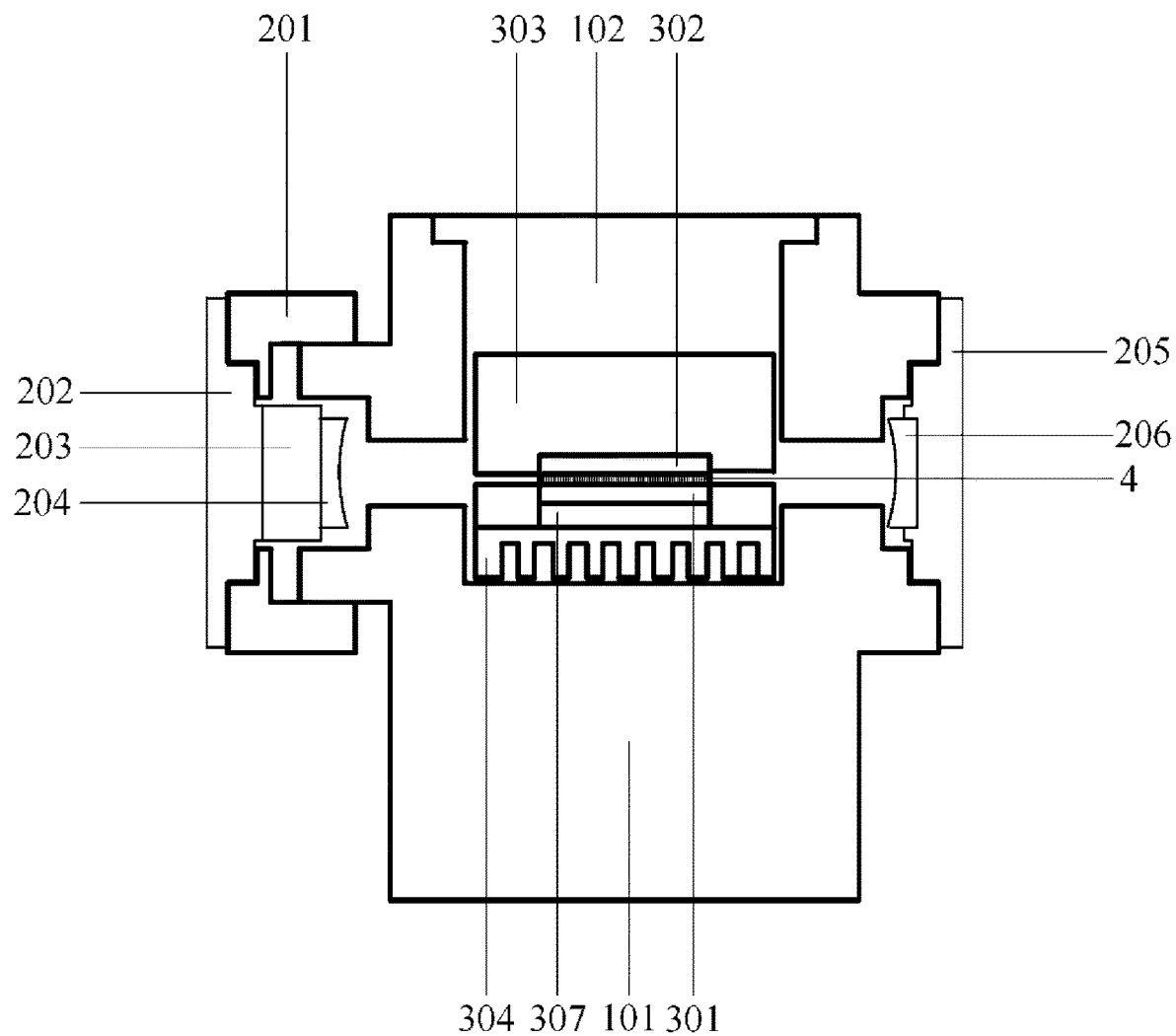
FIG. 1 illustrates a schematic sectional view of an integral optical resonant cavity for frequency conversion according to an embodiment of the present disclosure.
Figure 2A:
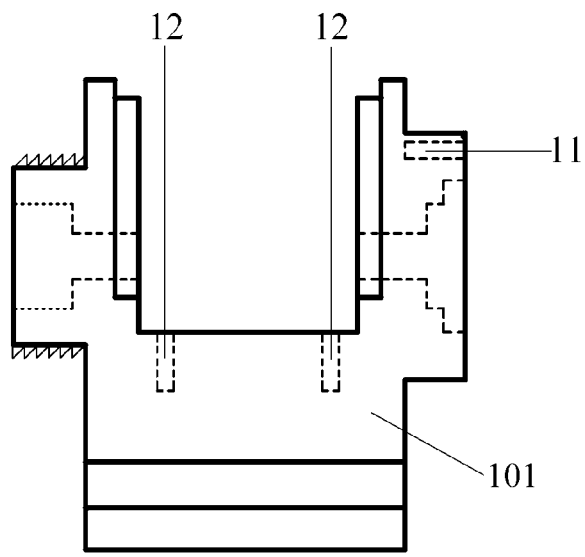
FIG. 2A illustrates a front schematic view of a U-shaped base of a housing according to an embodiment of the present disclosure.
Figure 2B:
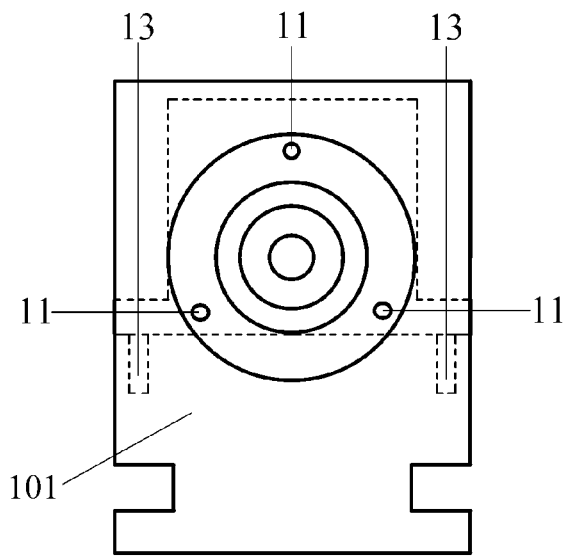
FIG. 2B illustrates a side schematic view of a U-shaped base of a housing according to an embodiment of the present disclosure.
Figure 3A:
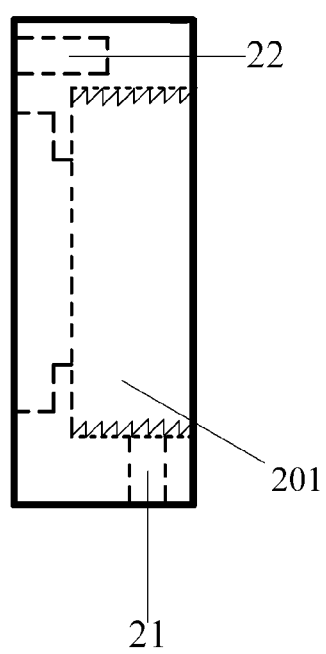
FIG. 3A illustrates a front schematic view of an adjustable mirror sleeve in a cavity-length adjustment device according to an embodiment of the present disclosure.
Figure 3B:
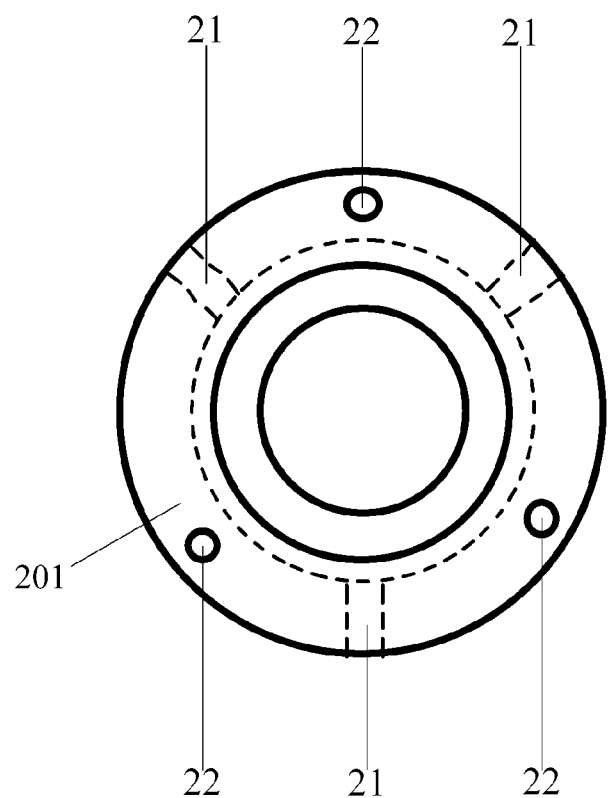
FIG. 3B illustrates a side schematic view of an adjustable mirror sleeve in a cavity-length adjustment device according to an embodiment of the present disclosure.
Figure 8A:
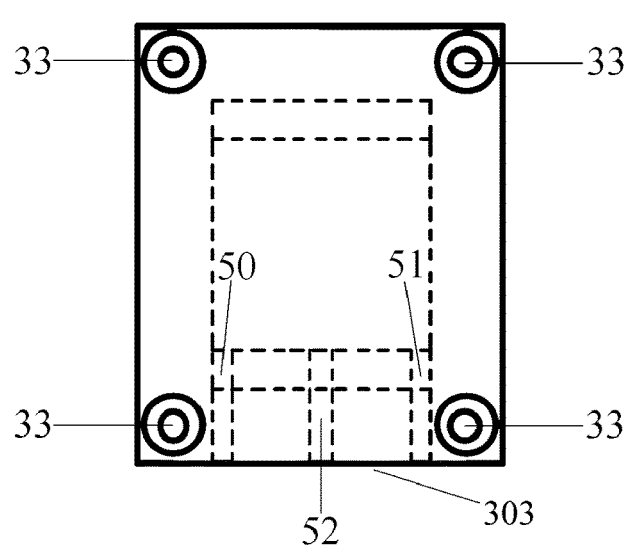
FIG. 8A illustrates a top schematic view of a thermal insulation sleeve in the temperature control device according to an embodiment of the present disclosure.
Figure 8B:
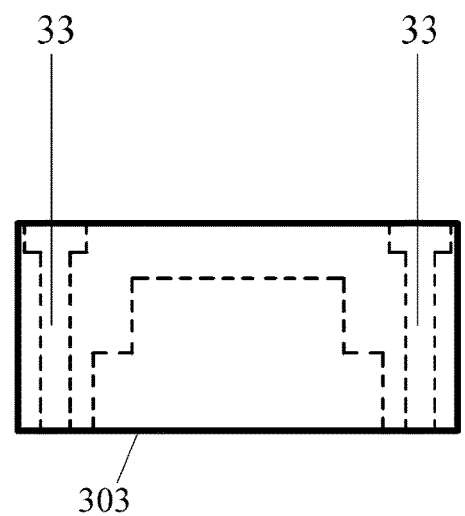
FIG. 8B illustrates a side schematic view of a thermal insulation sleeve in the temperature control device according to an embodiment of the present disclosure.
Figure 9A:
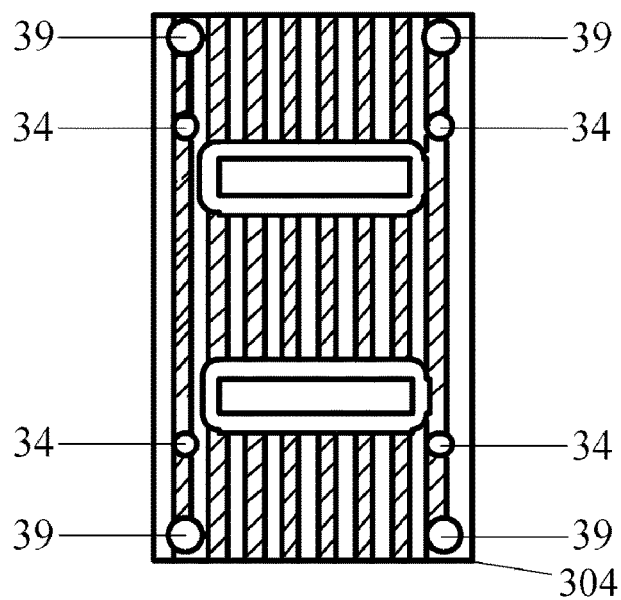
FIG. 9A illustrates a top schematic view of a thermal insulation sleeve base in the temperature control device according to an embodiment of the present disclosure.
Figure 9B:
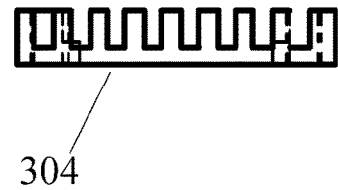
FIG. 9B illustrates a front schematic view of a thermal insulation sleeve base in the temperature control device according to an embodiment of the present disclosure.

The technical solutions of the embodiments of the present disclosure are clearly and completely described below with reference to the accompanying drawings. Apparently, the described embodiments are merely a part rather than all of the embodiments of the present disclosure. All other embodiments obtained by the person of ordinary skill in the art based on the embodiments of the present disclosure without creative efforts shall fall within the protection scope of the present disclosure.

An objective of the present disclosure is to provide an integral optical resonant cavity for frequency conversion, so as to achieve the optimal conditions of the phase matching, the impedance matching and the mode matching for the optical frequency conversion process, and to obtain the high nonlinear conversion efficiency. Furthermore, the integral design of whole optical resonant cavity can keep optical cavity mirrors and the nonlinear crystal clean, and which can make the fineness of the optical resonant cavity remain unchanged.

To make the above-mentioned objectives, features, and advantages of the present disclosure clearer and more comprehensible, the present disclosure will be further described in detail below with reference to the accompanying drawings and the specific implementations.

As shown in FIGS. 1-12, an integral optical resonant cavity for frequency conversion includes: a housing, a cavity-length adjustment device, a temperature control device and a nonlinear crystal provided in the temperature control device. The cavity-length adjustment device includes a first plano-concave mirror 204 and a second plano-concave mirror 206. The first plano-concave mirror 204, the second plano-concave mirror 206 and the nonlinear crystal 4 form an optical resonant cavity. Light passes through the first plano-concave mirror 204, the nonlinear crystal 4 and the second plano-concave mirror 206 sequentially.

The housing includes a U-shaped base 101 and a U-shaped cover 102. The U-shaped base 101 includes a groove, a right light-passing hole and a left light-passing hole. The U-shaped cover 102 is provided above the U-shaped base 101 in manner of sealing two sides of the groove of the U-shaped base 101 and a top opening of the U-shaped base 101.

The cavity-length adjustment device includes an adjustable mirror sleeve 201, a first mirror mount 202, a piezoelectric ceramic 203, the first plano-concave mirror 204, a second mirror mount 205 and the second plano-concave mirror 206. The adjustable mirror sleeve 201 is provided at the left light-passing hole of the U-shaped base 101. The first mirror mount 202 is provided in a light-passing hole of the adjustable mirror sleeve 201. A convex screw thread on a left end surface of the U-shaped base 101 and a concave screw thread on a right inner surface of the adjustable mirror sleeve 201 are engaged with each other, so that a length of the optical resonant cavity is adjusted by rotating the screw threads, i.e., the convex and concave screw threads. The second mirror mount 205 is provided in the right light-passing hole of the U-shaped base 101. The first plano-concave mirror 204 and the piezoelectric ceramic 203 are arranged in the first mirror mount 202.

The adjustable mirror sleeve 201 is provided at the left of the U-shaped base 101 in manner of connecting the left light-passing hole of the U-shaped base 101. Specifically, as the convex screw thread is provided on the left end surface of the U-shaped base 101, and the concave screw thread is provided on the right inner surface of the adjustable mirror sleeve 201, the U-shaped base 101 and the adjustable mirror sleeve 201 are fixed together, and the length of the optical resonant cavity is adjusted precisely by rotating these screw threads. There are three first threaded holes 21 on the adjustable mirror sleeve 201, so as to fully fix the adjustable mirror sleeve 201 and the U-shaped base 101 by using bolts upon the completion of the adjustment on the length of the cavity.

The first mirror mount 202 seals the light-passing hole of the adjustable mirror sleeve 201 and fixes the first plano-concave mirror 204. Specifically, as shown in FIG. 1, FIGS. 3A-3B and FIGS. 4A-4B, there are three second threaded holes 22 on the adjustable mirror sleeve 201, and three first through holes 23 corresponding to the respective second threaded holes 22 are formed on the first mirror mount 202, so as to connect the adjustable mirror sleeve 201 and the first mirror mount 202 together by using bolts. A pinhole 24 is provided in the first mirror mount 202 to enable a lead wire of the piezoelectric ceramic 203 to pass.

The second mirror mount 205 seals the right light-passing hole of the U-shaped base 101 and fixes the second plano-concave mirror 206. Specifically, as shown in FIG. 1, FIGS. 2A-2B and FIGS. 5A-5B, there are three third threaded holes 11 at the right of the U-shaped base 101, and three second through holes 25 corresponding to the respective third threaded holes 11 are provided on the second mirror mount 205, so as to connect the second mirror mount 205 and the U-shaped base 101 together by using bolts.

The temperature control device includes a crystal oven base 301, a top cover 302 of the crystal oven base, a thermal insulation sleeve 303, a thermal insulation sleeve base 304, a front thermal insulation pad 305, a rear thermal insulation pad 306, a Peltier element 307 and a thermistor. The temperature control device is provided in the groove of the U-shaped base 101.

Referring to FIG. 1, FIGS. 6A-6B and FIGS. 7A-7B, a groove for loading the nonlinear crystal 4 is formed in a center of the crystal oven base 301; the top cover 302 of the crystal oven base is provided with a protrusion; and the protrusion extends downward to enter the groove of the crystal oven base 301. The crystal oven base 301 is provided with a pinhole 30 extended toward a center of the groove from an end surface thereof and used for placing the thermistor. There are four fourth threaded holes 31 on the crystal oven base 301, and four third through holes 32, which are corresponding to the fourth threaded holes 31, respectively, are provided on the top cover 302 of the crystal oven base, so as to connect the crystal oven base 301 and the top cover 302 of the crystal oven base together by using bolts. The above structures are favorable to fix the nonlinear crystal 4.

Referring to FIGS. 8A-8B and FIGS. 9A-9B, the thermal insulation sleeve 303 is provided on an upper portion of the crystal oven, whereas the thermal insulation sleeve base 304 is provided on a lower portion of the crystal oven and fixed in the groove of the U-shaped base 101. Specifically, referring to FIG. 1, FIGS. 2A-2B, FIGS. 8A-8B and FIGS. 9A-9B, there are four fourth through holes 33 on the thermal insulation sleeve 303, four fifth through holes 34 corresponding to the respective fourth through holes 33 are provided on the thermal insulation sleeve base 304, and four fifth threaded holes 12 corresponding to the respective fourth through holes 33 are provided on the U-shaped base 101. So, the thermal insulation sleeve 303, thermal insulation sleeve base 304 and the U-shaped base 101 are connected and fixed together by using bolts.

Referring to FIGS. 10A-10B and FIGS. 11A-11B, the front thermal insulation pad 305 and the rear thermal insulation pad 306 are embedded into the thermal insulation sleeve base 304, so as to support the crystal oven base 301 and the thermal insulation sleeve base 304. The Peltier element 307 is provided between the crystal oven base 301 and the thermal insulation sleeve base 304. Specifically, referring to FIGS. 6A-6B, FIGS. 9A-9B, FIGS. 10A-10B and FIGS. 11A-11B, there are two sixth through holes 35 on the front thermal insulation pad 305, and two sixth threaded holes 36, which are corresponding to the respective sixth through holes 35, are provided on the crystal oven base 301, so as to connect the front thermal insulation pad 305 and the crystal oven base 301 together by using bolts. There are two seventh through holes 37 on the rear thermal insulation pad 306, and two seventh threaded holes 38, which are corresponding to the respective seventh through holes 37, are provided on the crystal oven base 301, so as to connect the rear thermal insulation pad 306 and the crystal oven base 301 together by using bolts.

Figure 12A:
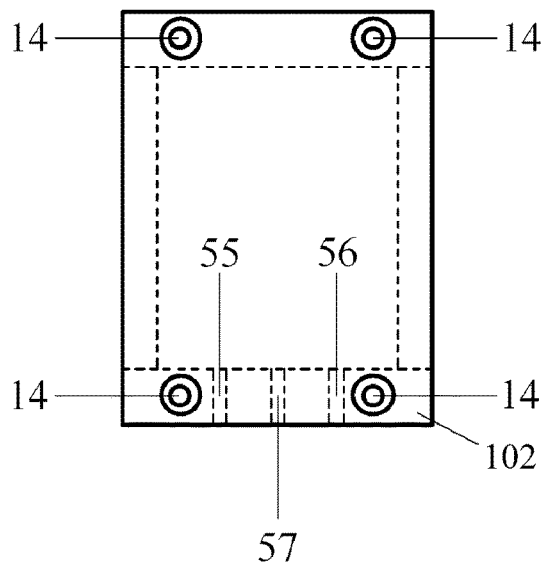
FIG. 12A illustrates a top schematic view of a U-shaped cover of the housing according to an embodiment of the present disclosure.
Figure 12B:
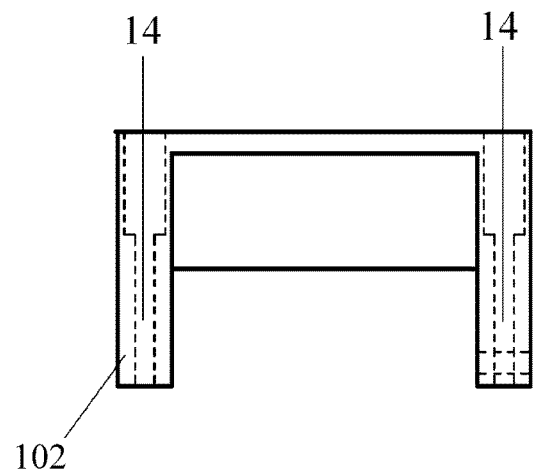
FIG. 12B illustrates a side schematic view of a U-shaped cover of the housing according to an embodiment of the present disclosure.

Referring to FIGS. 12A-12B, the U-shaped cover 102 is provided above the U-shaped base 101 in manner of sealing two sides of the groove of the U-shaped base 101 and the top opening of the U-shaped base 101. Specifically, referring to FIG. 1, FIGS. 2A-2B, FIGS. 8A-8B and FIGS. 12A-12B, there are four eighth through holes 14 on the U-shaped cover 102, four ninth through holes 39 corresponding to the respective eighth through holes 14 are provided on the thermal insulation sleeve base 304, and four eighth threaded holes 13 corresponding to the respective eighth through holes 14 are provided on the U-shaped base 101. So, the U-shaped cover 102, the thermal insulation sleeve base 304 and the U-shaped base 101 are connected together by using bolts.

Referring to FIGS. 8A-8B, FIGS. 10A-10B and FIGS. 12A-12B, the thermal insulation sleeve 303 is provided with a first wire channel 50 and a second wire channel 51. The front thermal insulation pad 305 is provided with a third wire channel 53 and a fourth wire channel 54. The U-shaped cover 102 is respectively provided with a fifth wire channel 55 and a sixth wiring dust 56. So, two lead wires of the Peltier element 307 may be passed. There are a seventh wire channel 52 on the thermal insulation sleeve 303 and an eighth wire channel 57 on the U-shaped cover 102, so as to enable the lead wire of the thermistor to pass.

The integral optical resonant cavity for frequency conversion provided by the present disclosure enables a discrete optical resonant cavity including the temperature control device, the nonlinear crystal 4, the first plano-concave mirror 204, the second plano-concave mirror 206 and the piezoelectric ceramic 203 in the prior art to integrate into an integral structure. That is, the nonlinear crystal 4 is provided in the temperature control device; the temperature control device is provided in the groove of the U-shaped base 101; the adjustable mirror sleeve 201 is provided at the left light-passing hole of the U-shaped base 101 in manner of connecting the left light-passing hole of the U-shaped base 101; the first plano-concave mirror 204 and the piezoelectric ceramic 203 are arranged in the first mirror mount 202; the first mirror mount 202 is provided in the light-passing hole of the adjustable mirror sleeve 201; the second plano-concave mirror 206 is provided in the second mirror mount 205; the second mirror mount 205 is provided in the right light-passing hole of the U-shaped base 101; and the first plano-concave mirror 204, the nonlinear crystal 4, the second plano-concave mirror 206 and the piezoelectric ceramic 203 are connected sequentially and are colinear. The first plano-concave mirror 204 is provided with a first curved surface protruding toward the first mirror mount 202. The second plano-concave mirror 206 is provided with a second curved surface protruding toward the second mirror mount 205, so as to form the stable optical resonant cavity together with the first curved surface. The nonlinear crystal 4 is provided between the first curved surface and the second curved surface. The convex screw thread on the left end surface of the U-shaped base 101 and the concave screw thread on the right inner surface of the adjustable mirror sleeve 201 are engaged with each other, so that the length of the optical resonant cavity is adjusted precisely by rotating the screw threads. The length of the integral optical resonant cavity is adjusted within 10 mm. The piezoelectric ceramic 203 is further used to further adjust the length of the cavity, so as to realize the nm-level adjustment on the length of the integral optical resonant cavity. Preferably, the waist spot of laser beams should be set in a center of the nonlinear crystal 4 to improve the frequency doubling efficiency when the laser beams pass through the integral optical resonant cavity provided by the present disclosure.

The temperature control device of the present disclosure enables the nonlinear crystal 4 to be heated uniformly and cooled quickly by providing the thermal insulation sleeve 303, the thermal insulation sleeve base 304, the front thermal insulation pad 305 and the rear thermal insulation pad 306, thereby accurately controlling the temperature. Specifically, referring to FIG. 1, the Peltier element 307 conducts heat to the crystal oven base 301, and conducts the heat to the nonlinear crystal 4 through the crystal oven base 301. A heating surface of the Peltier element 307 is attached to a bottom of the crystal oven base 301, whereas a cooling surface of the Peltier element 307 is attached to a top of the thermal insulation sleeve base 304. So, this design can accurately control the temperature of the nonlinear crystal 4. The thermal insulation sleeve 303, the front thermal insulation pad 305 and the rear thermal insulation pad 306 can function as an insulating layer, so as to prevent the fluctuation of the external temperature from influencing the nonlinear crystal 4. As the polysulfone material and the red copper material have a great difference in heat conductivity thereof, the nonlinear crystal 4 in the temperature control device is heated uniformly. A heat dissipation groove is provided in the thermal insulation sleeve base 304, such that the heat can be quickly dissipated to air through the thermal insulation sleeve base 304 when the Peltier element 307 produces cold. The thermistor is provided in the pinhole that is at a center of the crystal oven base 301 and close to the nonlinear crystal 4, and the thermistor is wrapped with an indium foil to be tightly in contact with the crystal oven base 301. Through the good heat conductivity of the indium foil, the thermistor can accurately give the feedback of a real-time temperature of the nonlinear crystal 4.

As a preferred embodiment, the nonlinear crystal 4 is one of a periodically poled lithium niobate (PPLN) crystal, a periodically poled KTiOPO$_4$ (PPKTP) crystal, a periodically poled MgO-doped lithium niobate (MgO:PPLN) crystal, and a periodically poled MgO-doped stoichiometric lithium tantalite (MgO:PPSLT) crystal.

As a preferred embodiment, the housing is made of stable and non-deformable duralumin; the crystal oven base 301, the top cover 302 of crystal oven base, and the thermal insulation sleeve base 304 in the temperature control device are made of high heat conductivity and non-deformable red copper. The thermal insulation sleeve 303, the front thermal insulation pad 305 and the rear thermal insulation pad 306 are made of a polysulfone material, which has the good insulating effect, wear resistance and high temperature resistance. The integral optical resonant cavity for high-efficient frequency conversion provided by the present disclosure has the advantages that the frequency conversion efficiency is high, the structure is simple, the stability is high, the size is small, the plug-and-play effect on a light path is realized, the operation is simple, and the batch production is suitable.

The technical solutions of the present disclosure may be exemplarily described in combination with the following two specific application embodiments.

Embodiment 1

Figure 13:
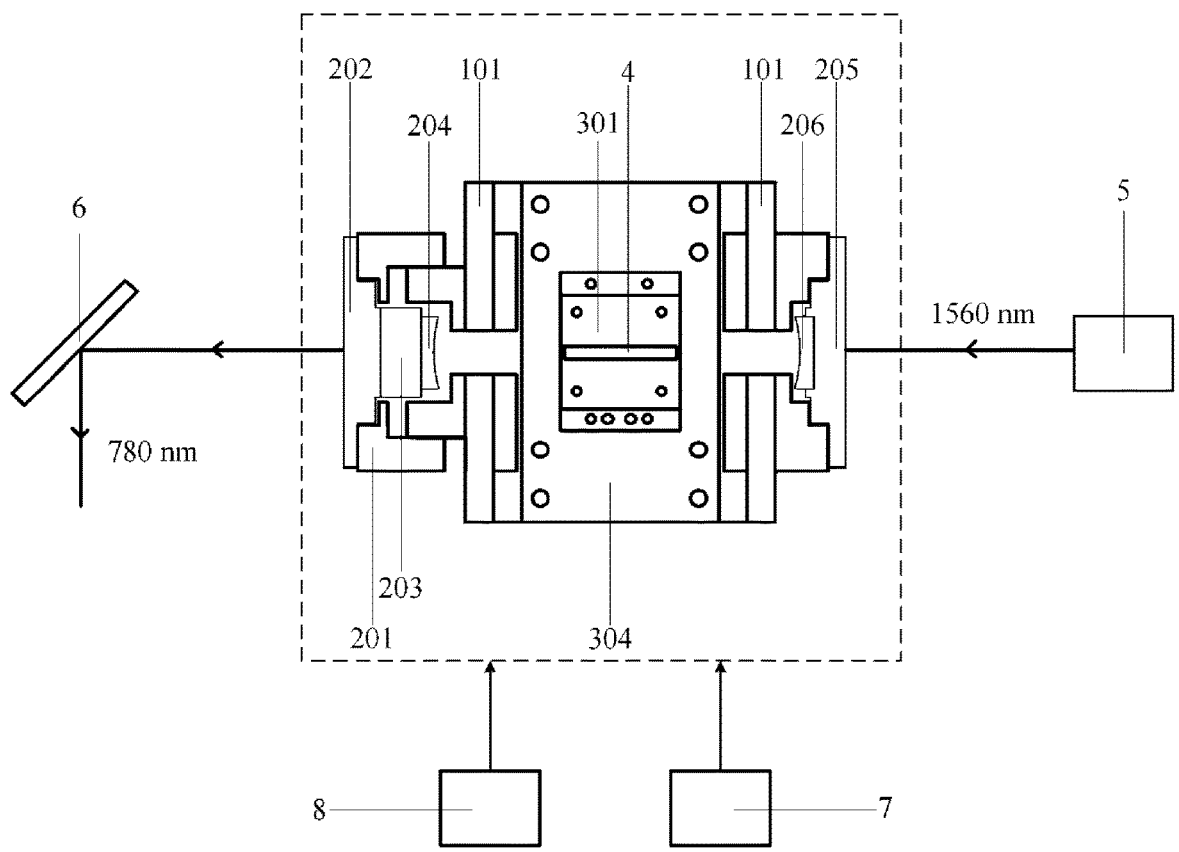
FIG. 13 illustrates a schematic view of a frequency doubling process according to an embodiment of the present disclosure.

As shown in FIG. 13, the integral optical resonant cavity for frequency conversion in the embodiment is used to generate frequency-doubling laser through an optical frequency doubling process. The experimental device includes a housing, a cavity-length adjustment device, a temperature control device, a nonlinear crystal 4, a laser 5, a bicolor plane mirror 6, a temperature controller 7, and a cavity-length locking feedback loop system 8. The laser 5 in the embodiment adopts a single-frequency continuous-wave fiber laser to use as a laser source, and has an output wavelength of 1560 nm and an output power of 5 W. The integral optical resonant cavity includes a first plano-concave mirror 204 and a second plano-concave mirror 206. The first plano-concave mirror 204 serves as an output coupler of the resonant doubling cavity, and the second plano-concave mirror 206 serves as an input coupler of the resonant doubling cavity. According to the film coating design, the integral optical resonant cavity for frequency conversion in the embodiment is of a double-end cavity. Fundamental frequency light is input from a right end surface of the integral optical resonant cavity, whereas frequency-doubling light is outputted from a left end surface of the integral optical resonant cavity. A partially reflective film (transmissivity thereof is T=90% @ 780 nm) for 780 nm light and a highly reflective film (reflectivity thereof is R>99% @ 1560 nm) for 1560 nm light are both coated on a first curved surface of the first plano-concave mirror 204. A partially reflective film (transmissivity thereof is T=13% @ 1560 nm) for 1560 nm light and a highly reflective film (reflectivity thereof is R>99% @ 780 nm) for 780 nm light are coated on a second curved surface of the second plano-concave mirror 206. The nonlinear crystal 4 is a periodically poled MgO-doped lithium niobate (MgO:PPLN) crystal, with a length of 20 mm, a width of 3 mm and a thickness of 1 mm. Two end surfaces of the crystal are planar, and are coated with a double-layer antireflection film (reflectivity thereof is R<0.5% @ 1560 nm & 780 nm) for 1560 nm and 780 nm. Each of the first plano-concave mirror 204 and the second plano-concave mirror 206 has a radius of curvature of 30 mm, and the optical resonant cavity has a total length of 65 mm. Laser source with a wavelength of 1560 nm is output by the laser 5 and then is injected into the integral optical resonant cavity as the fundamental frequency light. This laser undergoes frequency doubling process in the optical resonant cavity to generate the frequency-doubling light with a wavelength of 780 nm. The bicolor plane mirror 6 is used to separate apart the fundamental frequency light and the frequency-doubling light. That is, the 780 nm frequency-doubling light is reflected by the bicolor plane mirror 6 and output, and the residual 1560 nm fundamental frequency light is transmitted through the bicolor plane mirror 6 and output.

Embodiment 2

Figure 14:
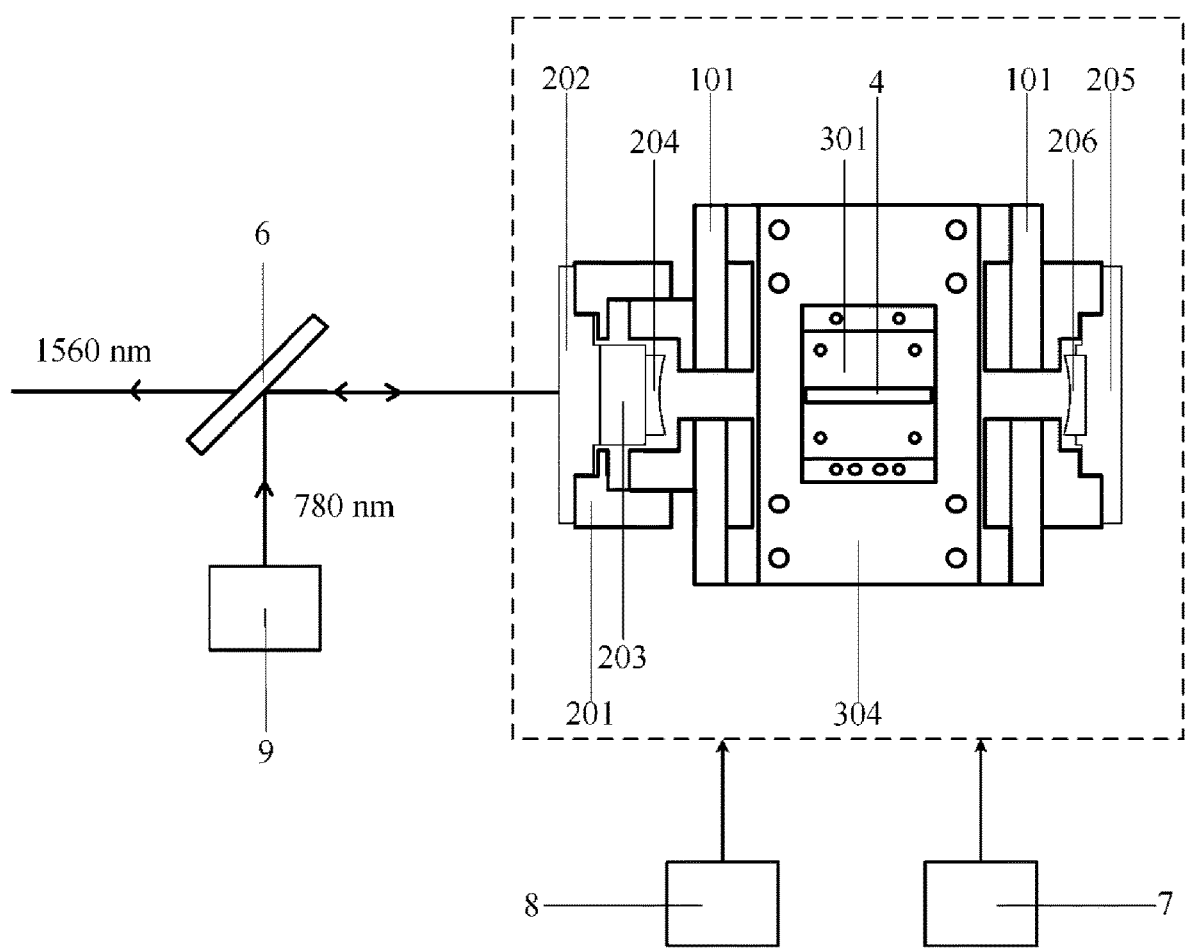
FIG. 14 illustrates a schematic view of an optical parametric down conversion process according to an embodiment of the present disclosure.

As shown in FIG. 14, the integral optical resonant cavity for frequency conversion in the embodiment is used to generate squeezed light fields during optical parametric down conversion process. The experimental device includes a housing, a cavity-length adjustment device, a temperature control device, a nonlinear crystal 4, a bicolor plane mirror 6, a temperature controller 7, a cavity-length locking feedback loop system 8, and a laser 9. The laser 9 in the embodiment adopts a single-frequency continuous-wave semiconductor laser as a laser light source, and has an output wavelength of 780 nm and an output power of 1 W. The integral optical resonant cavity includes a first plano-concave mirror 204 and a second plano-concave mirror 206. The first plano-concave mirror 204 serves as an input coupler and an output coupler of the resonant doubling cavity. According to the film coating design, the integral optical resonant cavity for frequency conversion in the embodiment is of a single-end cavity. Pumping light is input from a left end surface of the integral optical resonant cavity, and the down-conversion light or the squeezed light is output from the left end surface of the integral optical resonant cavity. A partially reflective film (transmissivity thereof is T=20% @ 780 nm & T=13% @ 1560 nm) for 780 nm light and 1560 nm light is coated on a first curved surface of the first plano-concave mirror 204. A highly reflective film (reflectivity thereof is R>99.5% @ 1560 nm & R>99% @ 780 nm) for 780 nm light and 1560 nm light is coated on a second curved surface of the second plano-concave mirror 206. The nonlinear crystal 4 is a PPKTP crystal, with a length of 20 mm, a width of 2 mm and a thickness of 1 mm. Two end surfaces of the crystal are planar, and are coated with a double-layer antireflection film (reflectivity thereof is R<0.5% @ 1560 nm & 780 nm) for 1560 nm light and 780 nm light. Each of the first plano-concave mirror 204 and the second plano-concave mirror 206 has a radius of curvature of 30 mm, and the optical resonant cavity has a total length of 65 mm. Laser with a wavelength of 780 nm is output by the laser 9 and then is injected into the integral optical resonant cavity as the pumping light. This laser light undergoes the optical parametric down conversion process in the optical resonant cavity. When the pumping power is greater than the threshold power of the optical parametric oscillation process, down-conversion light with a wavelength of 1560 nm is generated in a degenerate state. When the pumping power is less than the threshold power of the optical parametric oscillation process, squeezed vacuum light field with a wavelength of 1560 nm, the quantum noise of a certain quadrature component of which is less than the classical shot-noise limit (SNL), is generated. The bicolor plane mirror 6 is used to separate apart two light beams. That is, the 780 nm frequency-doubling light is reflected by the bicolor plane mirror 6 and input to the resonant cavity, and the 1560 nm light is transmitted through the bicolor plane mirror 6 and output.

Each embodiment of the present specification is described in a progressive manner, each embodiment focuses on the difference from other embodiments, and the same and similar parts between the embodiments may refer to each other.

In this specification, several examples are used for illustration of the principles and implementations of the present disclosure. The description of the foregoing examples is used to help illustrate the method of the present disclosure and the core principles thereof. In addition, those of ordinary skill in the art can make various modifications in terms of specific implementations and scope of application in accordance with the teachings of the present disclosure. In conclusion, the content of the present specification shall not be construed as a limitation to the present disclosure.

What is claimed is:

1. An integral optical resonant cavity for frequency conversion, comprising:
   a housing, a cavity length adjustment device, a temperature control device, and a nonlinear crystal provided in the temperature control device;
   wherein:
   the cavity length adjustment device is provided at both ends of the housing;
   the temperature control device is provided in the housing;
   the cavity length adjustment device includes a first plano-concave mirror and a second plano-concave mirror;
   the first plano-concave mirror, the second plano-concave mirror, and the nonlinear crystal form an optical resonant cavity;
   light passes through the first plano-concave mirror, the nonlinear crystal, and the second plano-concave mirror sequentially; and
   the housing comprises a U-shaped base and a U-shaped cover, a groove is formed in the U-shaped base; the U-shaped cover is provided above the U-shaped base in a manner of sealing two sides of the groove and a top opening of the U-shaped base; and the temperature control device is provided in the groove of the U-shaped base.

2. The integral optical resonant cavity of claim 1, wherein the cavity-length adjustment device comprises an adjustable mirror sleeve, a first mirror mount, a piezoelectric ceramic serving as a piezo-electric transducer, the first plano-concave mirror, a second mirror mount and the second plano-concave mirror;
   the adjustable mirror sleeve is provided at a left light-passing hole of the U-shaped base;
   the first mirror mount is provided in a light-passing hole of the adjustable mirror sleeve; and a convex screw thread on a left end surface of the U-shaped base and a concave screw thread on a right inner surface of the adjustable mirror sleeve are engaged with each other, such that a length of the integral optical resonant cavity is adjusted by rotating the convex screw thread and the concave screw thread;
   the second mirror mount is provided in a right light-passing hole of the U-shaped base; the first plano-concave mirror and the piezo-electric transducer are arranged in the first mirror mount, and the second plano-concave mirror is provided in the second mirror mount; and the first plano-concave mirror, the piezo-electric transducer, the nonlinear crystal and the second plano-concave mirror are connected sequentially and are colinear.

3. The integral optical resonant cavity of claim 2, wherein the first plano-concave mirror is provided with a first curved surface protruded toward the first mirror mount, the second plano-concave mirror is provided with a second curved surface protruded toward the second mirror mount, and the nonlinear crystal is provided between the first curved surface and the second curved surface.

4. The integral optical resonant cavity of claim 1, wherein the temperature control device comprises a crystal oven base, a top cover of the crystal oven base and a thermistor; a groove for loading the nonlinear crystal is formed in the crystal oven base; the top cover of the crystal oven base is provided with a protrusion; the protrusion extends downward to enter the groove of the crystal oven base; and the crystal oven base is provided with a pinhole extended toward a center of the groove from an end surface of the crystal oven base, and the pinhole is used for placing the thermistor.

5. The integral optical resonant cavity of claim 4, wherein the temperature control device further comprises a thermal insulation sleeve, a thermal insulation sleeve base, a front thermal insulation pad, a rear thermal insulation pad and a Peltier element; the thermal insulation sleeve is provided on an upper portion of the top cover of the crystal oven base, and the thermal insulation sleeve base is provided on a lower portion of the crystal oven base and fixed in a groove of the U-shaped base; the front thermal insulation pad and the rear thermal insulation pad are embedded into the thermal insulation sleeve base to support the crystal oven base and the thermal insulation sleeve base; and the Peltier element is provided between the crystal oven base and the thermal insulation sleeve base.

6. The integral optical resonant cavity of claim 1, wherein the nonlinear crystal is one of a periodically poled lithium niobate crystal, a periodically poled $KTiOPO_4$ crystal, a periodically poled MgO-doped lithium niobate crystal, and a periodically poled MgO-doped stoichiometric lithium tantalite crystal.

7. The integral optical resonant cavity of claim 1, wherein the housing is made of duralumin.

8. The integral optical resonant cavity of claim 5, wherein the crystal oven base, the top cover of the crystal oven base and the thermal insulation sleeve base are made of red copper; and the thermal insulation sleeve, the front thermal insulation pad and the rear thermal insulation pad are made of a polysulfone material.

* * * * *